(12) United States Patent
Hanaoka et al.

(10) Patent No.: US 7,963,113 B2
(45) Date of Patent: Jun. 21, 2011

(54) CYLINDER DEVICE

(75) Inventors: Mitsuhiro Hanaoka, Nagano (JP);
Osamu Ueno, Nagano (JP); Toshiaki Mitani, Nagano (JP); Takayoshi Shinohara, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 500 days.

(21) Appl. No.: 12/203,325

(22) Filed: Sep. 3, 2008

(65) Prior Publication Data

US 2009/0071325 A1 Mar. 19, 2009

(30) Foreign Application Priority Data

Sep. 5, 2007 (JP) ................................. 2007-229975

(51) Int. Cl.
*F16J 15/32* (2006.01)
*F15B 7/08* (2006.01)
(52) U.S. Cl. ............................................. 60/588
(58) Field of Classification Search ............ 60/585, 60/586, 588
See application file for complete search history.

(56) References Cited

U.S. PATENT DOCUMENTS 6,935,112 B2 * 8/2005 Koshimizu et al. ............ 60/588

FOREIGN PATENT DOCUMENTS

| JP | 7280103 | 10/1995 |
|----|---------|---------|
| JP | 2004-231093 | 8/2004 |
| JP | 2004-299568 | 10/2004 |
| JP | 2005-186925 | 7/2005 |
| JP | 2009-056922 | 3/2009 |

OTHER PUBLICATIONS

Office Action dated Sep. 15, 2009 for corresponding Japanese Application No. 2007-229975.

* cited by examiner

*Primary Examiner* — Thomas E Lazo
(74) *Attorney, Agent, or Firm* — Andrew M. Calderon; Roberts Mlotkowski Safran & Cole, P.C.

(57) ABSTRACT

A cup seal 21 includes a base portion 21a, an inner circumferential lip 21b slidingly contactable with a plunger 19 and an outer circumferential lip 21c contactable with the bottom surface 26a of the seal groove 26. Further, on the cup seal 21, there are provided elastic projections 21d projecting from the outer circumferential side leading end of the inner circumferential lip 21b toward the cylinder hole bottom portion. The length of the cup seal 21 from the base end face 21e to the leading end portions 21f is set longer than axial length of the seal groove 26. When the cup seal 21 is fitted into the seal groove 26, force is imparted on the inner circumferential lip 21b toward the cylinder hole inner circumferential direction to energize the inner circumferential lip 21b toward the piston all the time.

7 Claims, 6 Drawing Sheets

CYLINDER DEVICE

BACKGROUND OF THE INVENTION

1. Field of the Invention

The present invention relates to a cylinder device and, specifically, it relates to a cylinder device structured such that a piston is movably inserted into a cylinder through a cup seal, for example, a hydraulic master cylinder of a plunger type for a vehicle.

2. Description of Related Art

Conventionally, there is known a cylinder device structured such that, a annular seal groove is formed on an inner circumferential surface of a cylinder within which a piston is inserted and a cup seal is fitted into the seal groove. Herein, the cup includes a base portion to be fitted with the cylinder hole opening side surface of the seal groove, an inner circumferential lip extending from the inner circumferential side of the base portion of the cup seal to the bottom portion side of the cylinder hole of the cylinder and an outer circumferential lip extending from the outer circumferential side of the base portion of the cup seal to the bottom portion side of the cylinder hole (see, for example, Japanese Patent Unexamined Publication No. JP-A-2004-231093).

Also, as a hydraulic master cylinder of plunger type, there is known a structure in which, a projection projecting from the front end of the inner circumferential lip is formed on the inner circumferential lip of a cup seal. In this structure, when a piston is returned quickly, the projection is pressed against a side wall of the cylinder hole bottom portion of a seal groove and is thus deformed elastically to flex an outer circumferential lip, thereby forming a flow passage for operating fluid between the seal groove and cup seal (see, for example, Japanese Patent Unexamined Publication No. JP-A-2005-186925).

In the conventional cylinder device disclosed in the above-mentioned the JP-A-2004-231093, however, since the cup seal is fitted into the seal groove with a clearance in the axial direction of the cylinder, when the piston is operated, the cup seal can be moved in the cylinder axial direction, thereby raising a fear that the ineffective stroke of the piston is increased or the ineffective stroke of the piston is varied.

Further, in the conventional hydraulic master cylinder of the plunger type disclosed in the JP-A-2005-186925, although the projection is provided on the cup seal to prevent the cup seal from moving in the cylinder axial direction, the cup seal is caused to collapse when the piston is returned quickly. Therefore, when the inner circumferential lip is pressed outwardly in a radial direction due to the flow of the operating liquid and the piston is thus returned to its initial position while the cup seal is left flexed outwardly in the radial direction, there is a fear that a sealing force between the inner circumferential lip and piston is reduced.

SUMMARY OF THE INVENTION

In solving the above problems found in the conventional cylinder device, it is an object of the invention to provide a cylinder device which, by using a simple structure, can restrict the movement of the cup seal in the cylinder axial direction to thereby prevent the ineffective stroke of the piston from increasing or varying and also can secure proper seal performance between the inner circumferential lip and piston.

In attaining the above object, according to the invention, there is provided a cylinder device including:

a cylinder having a annular seal groove which is formed in an inner circumference thereof and includes:
   a bottom surface extending in circumferential direction of the cylinder;
   a cylinder hole bottom portion side surface and
   a cylinder hole opening side surface;
a piston movably inserted into the cylinder and
a cup seal fitted into the seal groove for sealing between the cylinder and piston, wherein
the cup seal includes:
   a base portion having a base end face contacting with the cylinder hole opening side surface of the seal groove;
   an inner circumferential lip extended from the inner circumferential side of the base portion toward the bottom portion of the cylinder hole and having an inner circumferential surface slidingly contacting with the piston;
   an outer circumferential lip extended from the outer circumferential side of the base portion toward the bottom portion of the cylinder hole and having an outer circumferential surface contacting with the bottom surface of the seal groove and
   a plurality of elastic projections provided along the circumferential direction thereof and projecting from the outer circumferential side of a leading end of the inner circumferential lip toward the cylinder hole bottom portion and
   a length of the cup seal from a leading end portion of the elastic projection to the base end face of the base portion is set longer than an axial direction of the seal groove.

Preferably, the elastic projections contacts with the cylinder hole bottom portion side surface of the seal groove to impart a force on an inner circumferential lip toward a cylinder hole inner circumferential direction, whereby the inner circumferential lip is always urged toward the piston.

More preferably, the leading end portions of the elastic projections contacts with the cylinder hole bottom portion side surface of the seal groove and are flexed toward the inner circumferential side thereof.

Further, the cylinder hole bottom portion side surface of the seal groove is preferably formed in a conical surface shape in which axial length thereof from the cylinder hole opening side surface increases gradually toward the inner circumference thereof.

Furthermore, a plurality of reinforcing portions projecting in a cylinder axial direction are preferably formed on the outer circumferential surface of the inner circumferential lip and the elastic projecting portions respectively preferably projects from the leading ends of their associated reinforcing portions.

Moreover, an outer circumferential surface of the elastic projection preferably contacts with the cylinder hole bottom portion side surface of the seal groove. Moreover, the cylinder device is preferably a hydraulic master cylinder for a vehicle.

According to a cylinder device of the invention, since the length from the leading end portions of the elastic projections to the base end face of the base portion is set longer than axial length of the seal groove, the movement of the cup seal in the cylinder axial direction is restricted to thereby prevent the ineffective stroke from increasing or varying. Further, since, due to the contact between the elastic projections and the cylinder hole bottom portion side surface of the seal groove, a force is imparted on the inner circumferential lip toward the cylinder hole inner circumferential direction, it is possible to secure a good sealing property between the inner circumferential lip and piston.

Further, when the leading ends of the elastic projections provided on the cup seal are contacted with the cylinder hole bottom portion side surface of the seal groove in a state where the leading ends are flexed toward the piston, due to a reactive force caused by flex of the leading ends, the inner circumferential lip of the cup seal can be urged toward the piston more positively.

Furthermore, when the cylinder hole bottom portion side surface of the seal groove is formed in a conical surface shape in which axial length from the cylinder hole opening side surface increases gradually toward the inner circumferential side, in a reactive force caused by the contact between the elastic projections and the cylinder hole bottom portion side surface of the seal groove, a component acting in the cylinder hole inner circumferential direction can be increased. Thus, the inner circumferential lip of the cup seal can be urged toward the piston side more positively. Also, the efficiency of the assembling operation of the cup seal into the seal groove can be enhanced and the leading end sides of the elastic projections can be flexed in the piston direction easily.

When a plurality of reinforcing portions are formed in the outer circumferential surface of the inner circumferential lip and elastic projections are provided on the leading ends of these reinforcing portions, rigidity of the inner circumferential lip can be enhanced and a stable sealing property can be secured. When compared with a structure in which the elastic projections are projected from the outer circumference of the leading end of the inner circumferential lip, a space in which the elastic projections can be flexed in the piston direction can be increased.

DETAILED DESCRIPTION OF THE PREFERRED EMBODIMENTS

Figure 1:
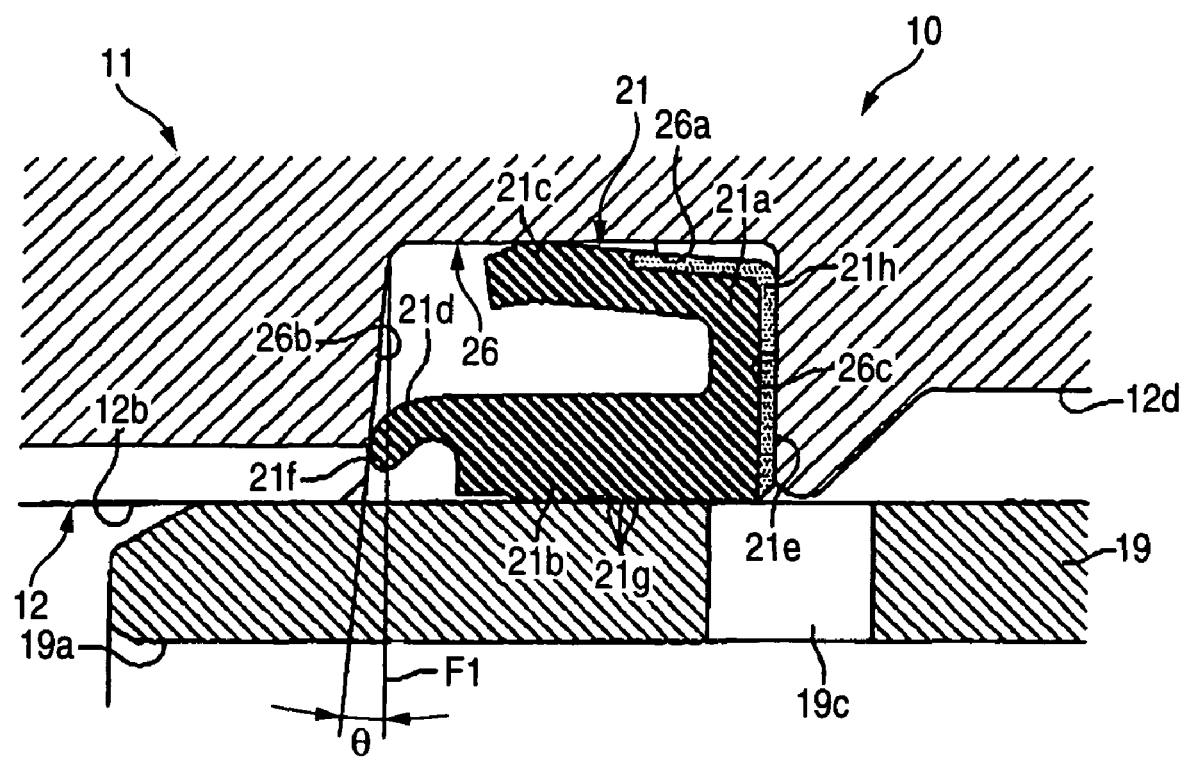
FIG. 1 is an enlarged section view of the main portions of a hydraulic master cylinder according to a first embodiment of the invention.
Figure 2:
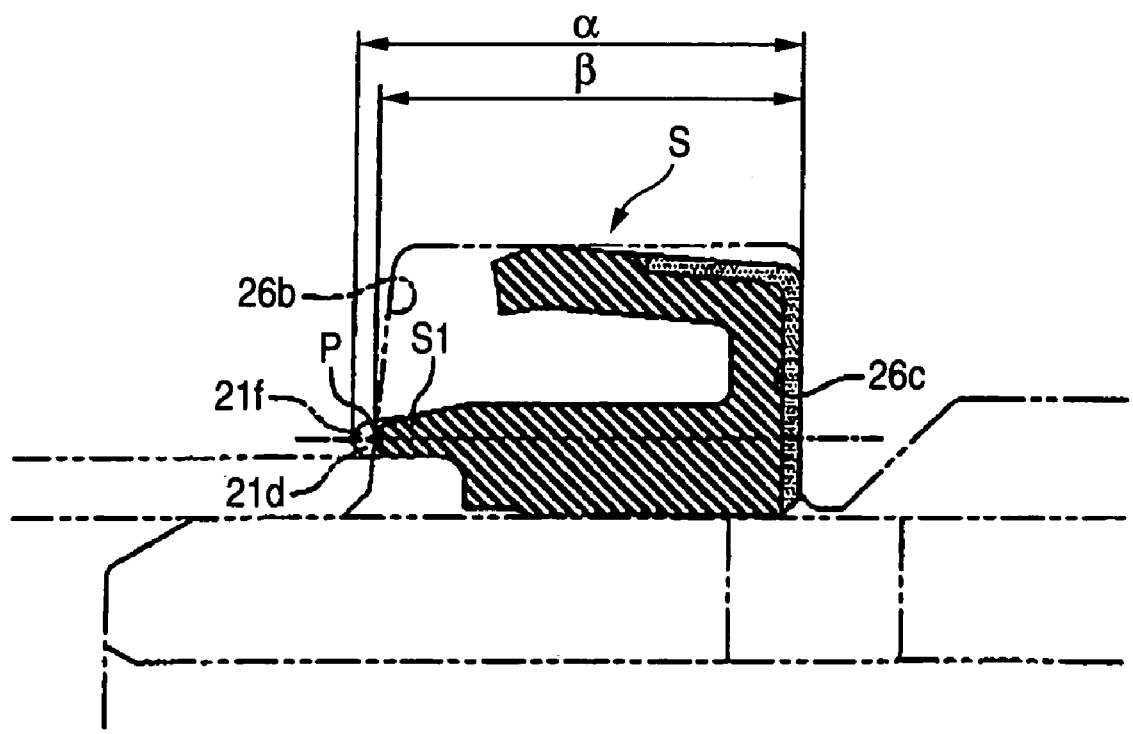
FIG. 2 is an explanatory view of the cylinder axial direction of a cup seal according to the first embodiment.
Figure 3:
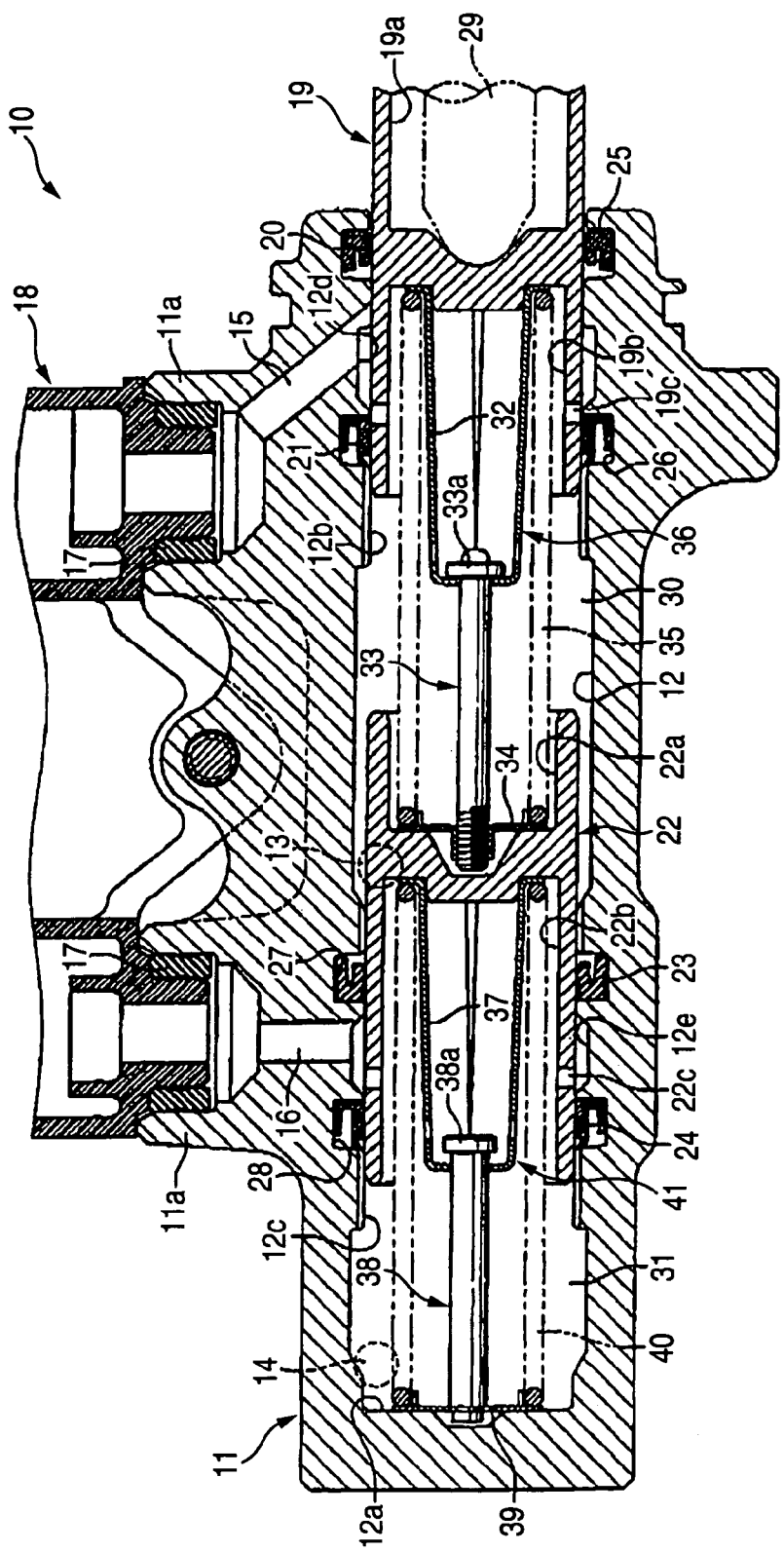
FIG. 3 is a section view of the hydraulic master cylinder according to the first embodiment.
Figure 4:
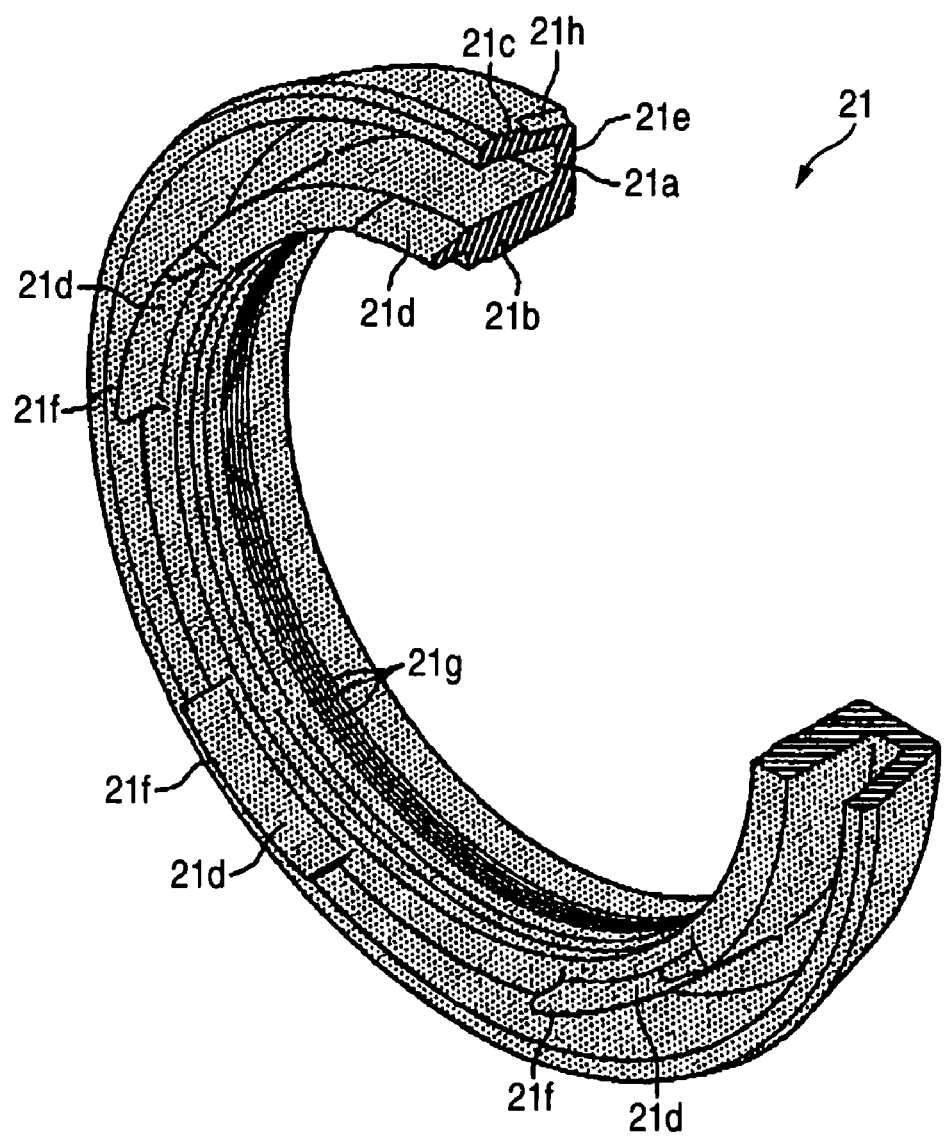
FIG. 4 is a partially cut-out perspective view of the cup seal.

Hereinafter, description will be given below in detail of embodiments in which the invention is applied to a hydraulic master cylinder of plunger type for a vehicle with reference to the accompanying drawings. FIGS. 1 to 4 show a first embodiment according to the invention. Specifically, FIG. 1 is an enlarged section view of the main portions of a hydraulic master cylinder, FIG. 2 is an explanatory view of the length of a cup seal in the cylinder axial direction, FIG. 3 is a section view of the hydraulic master cylinder and FIG. 4 is a partially cut-out perspective view of the cup seal.

The hydraulic master cylinder 10 includes a cylinder main body 11. The cylinder main body 11 includes a bottomed cylinder hole 12, a first output port 13 opened up in the cylinder axial direction intermediate portion of the cylinder hole 12 and a second output port 14 opened up on the bottom portion side of the cylinder hole 12.

The cylinder main body 11 further includes a pair of boss portions 11a and 11a respectively provided on and projected from the upper portion thereof. In the two boss portions 11a and 11a, a first hydraulic communication hole 15 and a second hydraulic communication hole 16 are formed respectively in communication with the cylinder hole 12. A reservoir 18 is mounted onto the two boss portions 11a and 11a via grommet seals 17 and 17.

A first plunger 19 (piston) is slidably inserted into the cylinder hole 12 through a first cup seal 20 and a second cup seal 21. Further, a second plunger 22 (piston) is also slidably inserted into the cylinder hole 12 through a third cup seal 23 and a fourth cup seal 24.

The first cup seal 20 is fitted into a first seal groove 25 formed on the cylinder hole opening side of the first hydraulic communication hole 15. The second cup seal 21 is fitted into a second seal groove 26 formed on the cylinder hole bottom portion side of the first hydraulic communication hole 15. The third seal 23 is fitted into a third seal groove 27 formed on the cylinder hole opening side of the second hydraulic communication hole 16. The fourth seal 24 is fitted into a fourth seal groove 28 formed on the cylinder hole bottom portion side of the second hydraulic communication hole 16.

In the respective plungers 19 and 22, first recessed portions 19a and 22a are formed on the cylinder hole opening side thereof and second recessed portions 19b and 22b are formed on the cylinder hole bottom portion side thereof.

A push rod 29 is inserted into the first recessed portion 19a of the first plunger 19. Between the second recessed portion 19b of the first plunger 19 and the first recessed portion 22a of the second plunger 22, a first hydraulic chamber 30 communicating with the first output port 13 formed in the cylinder axial direction intermediate portion and the first hydraulic communication hole 15 is formed. Further, between the second recessed portion 22b of the second plunger 22 and the bottom wall 12a of the cylinder hole 12, a second hydraulic chamber 31 communicating with the second output port 14 formed on the cylinder hole bottom portion side and the second hydraulic communication hole 16 is formed.

In the first plunger 19, one or more small-diameter communication holes 19c penetrating through the inside and outside of the first plunger 19 is formed in a portion which is nearer to the cylinder hole opening side than the second cup seal 21 when it is not in operation. Further, in the second plunger 22, similarly, one or more small-diameter communication holes 22c penetrating through the inside and outside of the second plunger 22 is formed in the portion which is nearer to the cylinder hole opening side than the fourth cup seal 24 when not in operation.

A first spring mechanism 36 is arranged in the first hydraulic chamber 30. The first spring mechanism 36 includes: a substantially cylindrical first retainer 32; a first guide pin 33 which is inserted into the first retainer 32 and which has a head portion 33a secured to the leading end portion of the first retainer 32 and a base portion secured to a first securing plate 34; and a first return spring 35 which urges the first plunger 19 toward the cylinder hole opening side.

Further, as well as the first spring mechanism 36 arranged in the first hydraulic chamber 30, a second spring mechanism 41 is arranged in the second hydraulic chamber 31. The second spring mechanism 41 includes: a substantially cylindrical second retainer 37; a second guide pin 38 which is inserted into the second retainer 37 and which includes a head portion 38a secured to the leading end portion of the second retainer 37 and a base portion secured to a second securing plate 39; and a second return spring 40 which urges the second plunger 22 toward the cylinder hole opening side.

The cylinder hole 12 includes two small-diameter cylinder portions 12b and 12c respectively formed in portions thereof that exist on the cylinder hole bottom portion sides of the second seal groove 26 and fourth seal groove 28. The cylinder hole 12 also includes a large-diameter cylinder portion 12d which communicates with the first hydraulic communication hole 15 and communication port 19c and which is formed in portions thereof that exist on the cylinder hole opening sides of the second seal groove 26 and fourth seal groove 28; and a large-diameter cylinder portion 12e communicating with the second hydraulic communication hole 16 and communication port 22c. The first seal groove 25 and third seal groove 27 are respectively well-known annular seal grooves and the first cup seal 20 and third cup seal 23 are also well-known cup seals.

The second seal groove 26 and second cup seal 21 as well as the fourth seal groove 28 and fourth cup seal 24 are respectively elements to which the invention is applied and also which have the same structure. Therefore, description will be given below of the second seal groove 26 and second cup seal 21 shown in FIG. 1 and thus the detailed description of the fourth seal groove 28 and fourth cup seal 24 is omitted here.

The second seal groove 26 is a annular groove which includes a bottom surface 26a extending in the circumferential direction of the second seal groove 26, a cylinder hole bottom portion side surface 26b and a cylinder hole opening side surface 26c. The cylinder hole bottom portion side surface 26b is formed in a conical surface shape in which axial direction length from the cylinder hole opening side surface 26c is set so as to increase gradually toward the inner circumferential side thereof and it is inclined with an angle of θ with respect to a radial-direction surface F1.

The second cup seal 21 includes: a base portion 21a to be contacted with the cylinder hole opening side surface 26c of the second seal groove 26; an inner circumferential lip 21b which is extended from the inner circumferential side of the base portion 21a toward the bottom portion of the cylinder hole 12 and is slidingly contacted with the first plunger 19; and an outer circumferential lip 21c which is extended from the outer circumferential side of the base portion 21a toward the bottom portion of the cylinder hole 12 and is contacted with the bottom surface 26a of the second seal groove 26.

The radial dimension of the inner circumferential lip 21b is set as about twice the radial dimension of the outer circumferential lip 21c. The inner circumferential lip 21b includes a plurality of elastic projections 21d extending from an outer circumferential side leading end thereof to the cylinder hole bottom portion side thereof while having regular intervals in the circumferential direction of the inner circumferential lip 21b. Further, the length of the base end portion 21a from the base end surface 21e contacting with the cylinder hole opening side surface 26c of the second seal groove 26 to the leading end portion 21f of the elastic projections 21d is set longer than axial length of the second seal groove 26 so that the leading end portions 21f of the elastic projections 21d contact with the cylinder hole bottom portion side surface 26b of the second seal groove 26 in such a manner that they are flexed toward the plunger 19, when the second cup seal 21 is fitted into the second seal groove 26.

A plurality of annular grooves 21g are formed in the circumferential direction of the inner circumferential lip 21b so as to be parallel to each other in a contact surface between the inner circumferential lip 21b and the first plunger 19. Further, a plurality of communication grooves 21h which allow the inner and outer circumferential sides to the base portion 21a to communicate with each other are formed on the base end face 21e and an outer circumferential surface of the outer circumferential lip 21c on the base end face side.

Here, referring in detail to the relationship of the axial lengths of the second cup seal 21 and second seal groove 26.

For example, as shown by a solid line in FIG. 2, when a point, where the cylinder hole bottom portion side surface 26b contacts with the elastic projection S1 of a cup seal S, which is assumed to be mounted into the second seal groove 26 in the axial direction thereof with no clearance between them and without being deformed, is expressed as a virtual point P. The leading end portions 21f of the elastic projections 21d of the second cup seal 21 according to the present embodiment not deformed before the second cup seal 21 is mounted into the second seal groove 26 are assumed that they are situated on the cylinder axial-direction extension line of the virtual point P. Thus, a length α from the leading end portion 21f to the cylinder hole opening side surface 26c of the second seal groove 26 is longer than a length β extending from the virtual point P to the cylinder hole opening side surface 26c of the second seal groove 26.

In this manner, since the length α is longer than the length β, when the second cup seal 21 is fitted with the second seal groove 26, the leading end portion 21f of the elastic projection 21d contacts with the cylinder hole bottom portion side surface 26b of the second seal groove 26 in such a manner that it is flexed toward the first plunger 19.

According to the above-structured hydraulic master cylinder 10, when it is not in operation, the first plunger 19 and second plunger 22 are situated at positions shown in FIG. 2 while being urged by the spring forces of the first and second return springs 35 and 40. Thus, the operating fluid is allowed to communicate between the reservoir 18 and the first hydraulic chamber 30 through the first hydraulic communication hole 15, the large-diameter cylinder portion 12d and the communication port 19c; and the operating fluid is also allowed to communicate between the reservoir 18 and second hydraulic chamber 31 through the second the second hydraulic communication hole 16, the large-diameter portion 12e and the communication port 22c.

While the hydraulic master cylinder 10 is in operation, if the push rod 29 pushes against the first plunger 19 toward the cylinder hole bottom portion side, the first plunger 19 advances the cylinder hole 12 in the bottom portion direction while compressing the first return spring 35 provided within the first hydraulic chamber 30 and, at the same time, the second plunger 22 starts to advance in the cylinder hole bottom portion direction. On the first hydraulic chamber 30 side, the first plunger 19 advances from its non-operating state and the cylinder axial-direction rear end portion of the communication port 19c passes through the base portion 21a of the inner circumferential lip 21b of the second cup seal 21, whereby the hydraulic starts to increase in the first hydraulic chamber 30 at the time when the communication between the first hydraulic chamber 30 and reservoir 19 is cut. The pressure-increased operating liquid is supplied through the first output port 13 to one brake system.

At this time, since the leading end portions 21f of the elastic projections 21d provided on the second cup seal 21 are respectively contacted with the cylinder hole bottom portion side surface 26b of the second seal groove 26 in such a manner that it is flexed toward the first plunger, the movement of the second cup seal 21 in the axial direction of the cylinder is restricted, thereby the ineffective stroke can be prevented from increasing or varying.

Further, in the second cup seal 21, since the elastic projections 21d are respectively fitted into the second seal groove 26 in such a manner that they are flexed toward the first plunger 19, the inner circumferential lip 21b is always urged toward the first plunger 19 due to a reactive force with respect to the flexed state of the elastic projections 21d, thus, a proper sealing property between the inner circumferential lip 21*b* and first plunger 19 can be secured.

Also, the radial dimension of the inner circumferential lip 21*b* is set as about twice the radial dimension of the outer circumferential lip 21*c* and the elastic projections 21*d* are projected from the outer circumferential side leading end of the inner circumferential lip 21*b*. Therefore, the rigidity of the inner circumferential lip 21*b* can be enhanced to thereby secure a stable sealing property. Thus, when compared with a structure in which the inner circumferential lip 21*b* is formed to have a normal thickness which is almost as thick as the outer circumferential lip 21*c*, a space in which the elastic projections 21*d* can be flexed in the direction of the first plunger 19 can enlarged.

Further, since the cylinder hole bottom portion side surface 26*b* of the second seal groove 26 is formed in a conical surface shape in which axial length thereof from the cylinder hole opening side surface 26*c* increases gradually toward the inner circumferential side thereof, of a reactive force with respect to the flexing of the elastic projections 21*d*, a component acting in the cylinder hole inner circumferential direction can be increased. Owing to this, the inner circumferential lip 21*b* can be urged toward the first plunger 19 more positively and the efficiency of the fitting operation of the second cup seal 21 into the second seal groove 26 can be enhanced, whereby the leading end portions 21*f* of the elastic projections 21*d* can be flexed easily in the direction of the first plunger 19.

Also, when the first plunger 19 moves back to its initial position, since the elastic projections 21*d* are provided at predetermined intervals and a clearance is formed between the mutually adjoining elastic projections 21*d*, the operating liquid is allowed to flow properly from the reservoir 18 side into the first hydraulic chamber 30 through this clearance and the above-mentioned communication groove 21*h*. Thus, the second cup seal 21 is not deformed unreasonably.

Although detailed description is omitted, in the second hydraulic chamber 31 as well, similarly to the first hydraulic chamber 30, with the advance of the second plunger 22, the hydraulic is increased; and, the fourth seal groove 28 and fourth cup seal 24 also can provide similar operations and effects to the second seal groove 26 and second cup seal 21.

Figure 5:
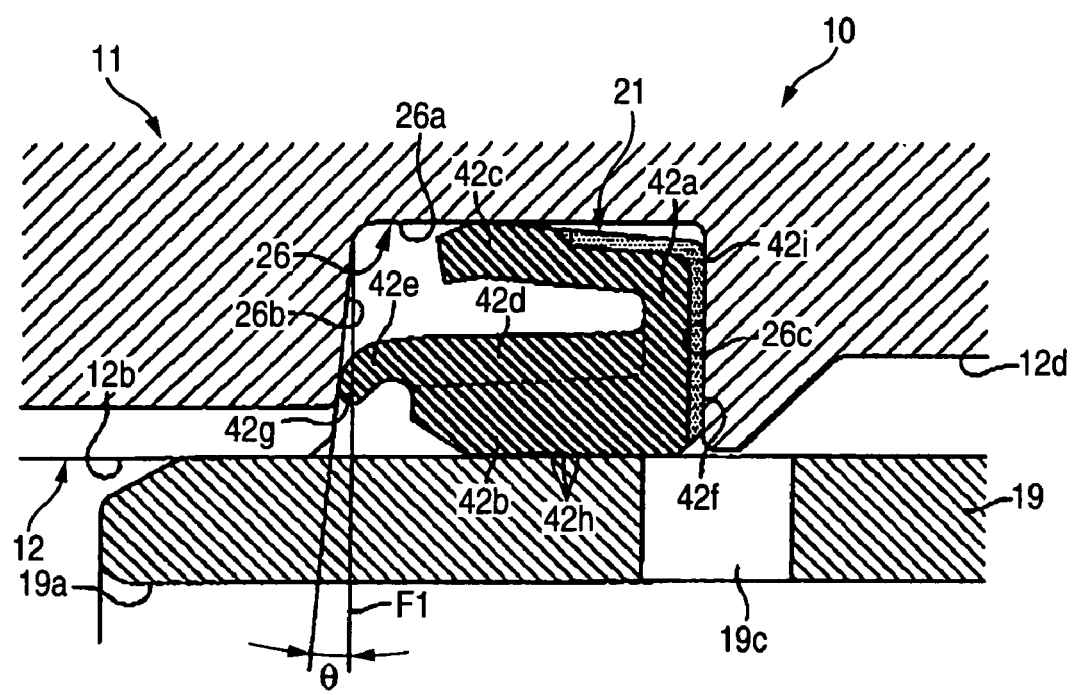
FIG. 5 is an enlarged section view of the main portions of a hydraulic master cylinder according to a second embodiment of the invention and FIG. 6 is a partially cut-out perspective view of the cup seal.
Figure 6:
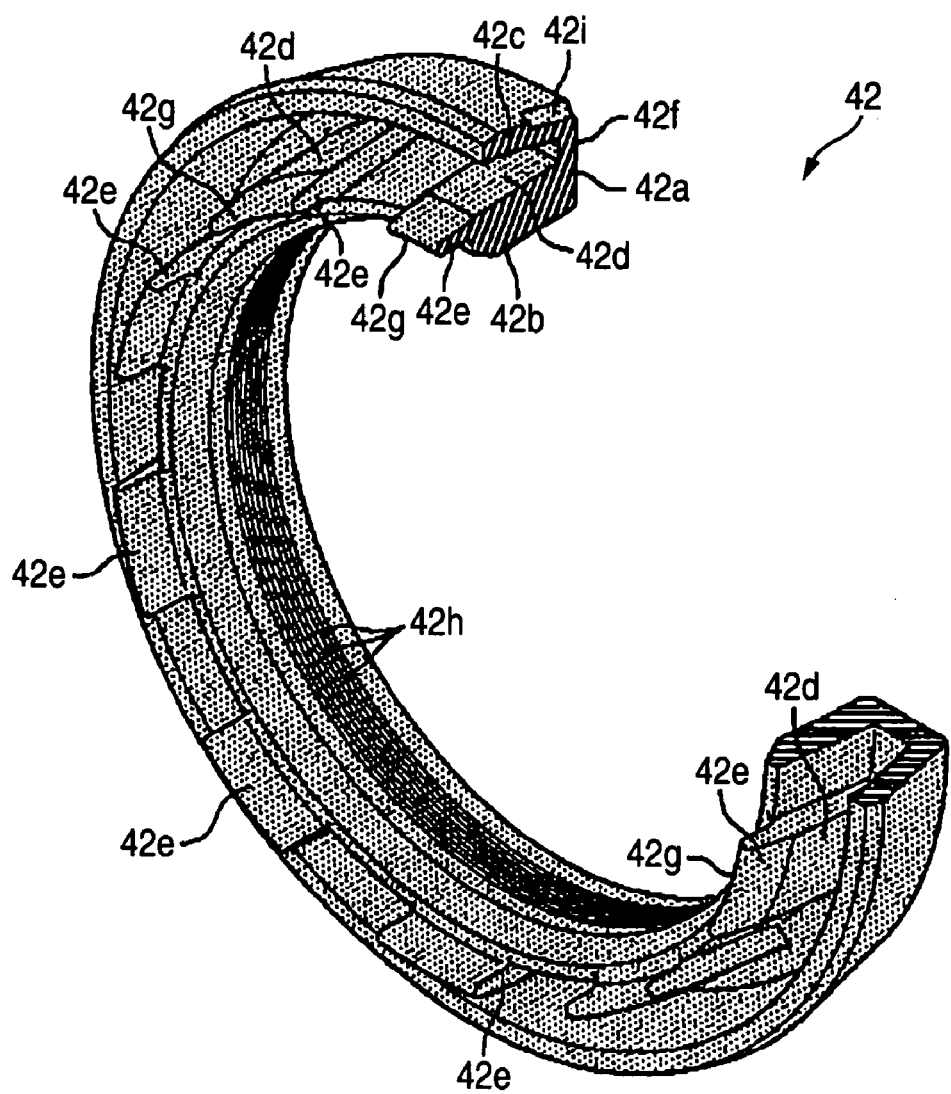

Now, FIGS. 5 and 6 respectively show a second embodiment according to the invention. Specifically, FIG. 5 is an enlarged section view of the main portions of a hydraulic master cylinder and FIG. 6 is a partially cut-out perspective view of a cup seal. Here, the elements thereof similar to those used in the first embodiment are given the same designations and thus the detailed description thereof is omitted here.

A second cup seal 42 according to the present embodiment includes a base portion 42*a* to be contacted with the cylinder hole opening side surface 26*c* of the second seal groove 26, an inner circumferential lip 42*b* which is extended from the inner circumferential side of the base portion 42*a* toward the bottom portion of the cylinder hole 12 and can be slidingly contacted with the first plunger 19 and an outer circumferential lip 42*c* which is extended from the outer circumferential side of the base portion 42*a* toward the bottom portion of the cylinder hole 12 and can be contacted with the bottom surface 26*a* of the second groove 26. On the outer circumferential surface of the inner circumferential lip 42*b*, a plurality of reinforcing portions 42*d* respectively extending in the cylinder axial direction are projectingly provided and a plurality of elastic projections 42*e* respectively projecting from the leading ends of their associated reinforcing portions 42*d* toward the cylinder hole bottom portion are provided.

Further, in the second cup seal 42, the length from its base end face 42*f* to be contacted with the cylinder hole opening side surface 26*c* of the second seal groove 26 of the base portion 42*a* to the leading end portion 42*g* of the elastic projection 42*e* is set longer than the axial length of the second seal groove 26, so that, when the second cup seal 42 is fitted into the second seal groove 26, the leading end portions 42*g* of the elastic projections 42*e* can be contacted with the cylinder hole bottom portion side surface 26*b* of the second seal groove 26 in such a state where they are flexed toward the plunger. Further, in the contact surface of the inner circumferential lip 42*b* with the first plunger 19, a plurality of annular grooves 42*h* which respectively extend in the circumferential direction so as to be parallel to each other are formed and a plurality of communication grooves 42*i* which allow the inner and outer circumferential sides of the base portion 42*a* to communicate with each other are formed over the base end face 42*f* and the base end face side outer circumferential surface of the outer circumferential lip 42*c*.

By the way, in the above-mentioned respective embodiments, the leading ends of the elastic projections are formed such that, when the cup seal is fitted into the seal groove, they are contacted with the cylinder hole bottom portion side surface of the seal groove and are thereby flexed toward the inner circumference side; and also, the cylinder hole bottom portion side surface of the seal groove is formed in a conical surface shape to enlarge the force imparted onto the inner circumferential lip toward the cylinder hole inner circumference direction. However, the cylinder hole bottom portion side surface may not always be formed in a conical surface shape. That is, provided that the leading end portions of the elastic projections are formed to be flexed toward the inner circumferential side, force in the cylinder hole inner circumferential direction can be generated in the inner circumferential lip. Also, provided that the cylinder hole bottom portion side surface is formed in a conical surface shape having a proper angle, even if the leading end portions of the elastic projections are not flexed toward the inner circumference, force in the cylinder hole inner circumferential direction can be generated in the inner circumferential lip.

Further, the seal groove may have a structure in which the cylinder hole bottom portion side surface is not be formed in a conical surface shape but it is arranged parallel to the cylinder hole opening side surface. In this case, the axial length of the seal groove 26 equals to the cylinder axial length of the opening of the seal groove.

Also, in the above-mentioned respective embodiments, description has been given with reference to a tandem type hydraulic master cylinder. However, the invention is not limited to this but it can also be applied to a single type hydraulic master cylinder. Further, the invention can also be applied to other various types of cylinder device including a hydraulic master cylinder for a clutch and a wheel cylinder for a drum brake.

What is claimed is:

1. A cylinder device comprising:
a cylinder having a annular seal groove which is formed in an inner circumference thereof and includes:
a bottom surface extending in circumferential direction of the cylinder;
a cylinder hole bottom portion side surface and
a cylinder hole opening side surface;
a piston movably inserted into the cylinder and
a cup seal fitted into the seal groove for sealing between the cylinder and piston, wherein
the cup seal comprises:
a base portion having a base end face contacting with the cylinder hole opening side surface of the seal groove;

an inner circumferential lip extended from the inner circumferential side of the base portion toward the bottom portion of the cylinder hole and having an inner circumferential surface slidingly contacting with the piston;

an outer circumferential lip extended from the outer circumferential side of the base portion toward the bottom portion of the cylinder hole and having an outer circumferential surface contacting with the bottom surface of the seal groove and a plurality of elastic projections provided along the circumferential direction thereof and projecting from the outer circumferential side of a leading end of the inner circumferential lip toward the cylinder hole bottom portion and a length of the cup seal from a leading end portion of the elastic projection to the base end face of the base portion is set longer than an axial direction of the seal groove.

2. The cylinder device as set forth in claim 1, wherein, the elastic projections contacts with the cylinder hole bottom portion side surface of the seal groove to impart a force on an inner circumferential lip toward a cylinder hole inner circumferential direction, whereby the inner circumferential lip is always urged toward the piston.

3. The cylinder device as set forth in claim 1, wherein, the leading end portions of the elastic projections contacts with the cylinder hole bottom portion side surface of the seal groove and are flexed toward the inner circumferential side thereof.

4. The cylinder device as set forth in claim 1, wherein the cylinder hole bottom portion side surface of the seal groove is formed in a conical surface shape in which axial length thereof from the cylinder hole opening side surface increases gradually toward the inner circumference thereof.

5. The cylinder device as set forth in claim 1, wherein, a plurality of reinforcing portions projecting in a cylinder axial direction are formed on the outer circumferential surface of the inner circumferential lip and the elastic projecting portions respectively projects from the leading ends of their associated reinforcing portions.

6. The cylinder device as set forth in claim 1, wherein the cylinder device is a hydraulic master cylinder for a vehicle.

7. The cylinder device as set forth in claim 1, wherein an outer circumferential surface of the elastic projection contacts with the cylinder hole bottom portion side surface of the seal groove.

* * * * *